United States Patent
Plouffe, Jr.

(10) Patent No.: US 6,466,979 B1
(45) Date of Patent: Oct. 15, 2002

(54) ADAPTIVE SYSTEM FOR OPTIMIZING A PHYSICAL CONNECTION IN A COMMUNICATION SESSION

(75) Inventor: Wilfred E. Plouffe, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/192,208

(22) Filed: Nov. 9, 1998

(51) Int. Cl.[7] .............................................. G06F 13/00
(52) U.S. Cl. ....................... 709/226; 709/229; 370/468
(58) Field of Search ................................ 709/223, 224, 709/226, 220, 221, 222, 227, 229; 370/468

(56) References Cited

U.S. PATENT DOCUMENTS

| 5,583,792 A | * | 12/1996 | Li et al. ...................... 340/907 |
| 5,889,956 A | * | 3/1999 | Hauser et al. ............... 709/226 |
| 6,094,680 A | * | 7/2000 | Hokanson .................... 709/223 |
| 6,118,791 A | * | 9/2000 | Fichou et al. ................ 370/230 |
| 6,370,572 B1 | * | 4/2002 | Lindskog et al. ........... 709/223 |

* cited by examiner

Primary Examiner—Dung C. Dinh
(74) Attorney, Agent, or Firm—Michael J. Buchenhorner; Jon A. Gibbons; Fleit, Kain, Gibbons, Gutman & Bongini P.L.

(57) ABSTRACT

An adaptive system for optimizing the bandwidth of a communication link in a communications session is disclosed. The decision as to when bandwidth in a communication session is to be released, or added, is based on the actual user activity rather than on an a priori determination which may not reflect the actual workload. Additionally, this decision is based on the actual costs associated with maintaining, releasing, and/or establishing a communication link or additional bandwidth. The costs include both direct costs and opportunity costs. The algorithm can also adapt its decision making process to its own performance, using feedback information to determine if it is minimizing the costs involved.

29 Claims, 4 Drawing Sheets

| END OF TIME WINDOW | 1st | 2nd | 3rd | 4th | 5th | 6th |
|---|---|---|---|---|---|---|
| CURRENT ACCESS DENSITY | 3 | 4 | 0 | 0 | 0 | 2 |
| CURRENT ACCESS FREQUENCY | 1.5 accesses/ minute | 2 | 0.25 | 0.167 | 0.125 | |
| FREQUENCY COUNT VARIABLE | 1 | 1 | 2 | 3 | 4 | 1 |
| RING BUFFER VALUES (shown as a stack) | 1.5 | 2<br>1.5 | 1.125<br>1.5 | 0.806<br>1.5 | 0.636<br>1.5 | 1<br>0.636<br>1.5 |

ADAPTIVE SYSTEM FOR OPTIMIZING A PHYSICAL CONNECTION IN A COMMUNICATION SESSION

CROSS-REFERENCE TO RELATED APPLICATIONS

Not applicable.

BACKGROUND OF THE INVENTION

1. Field of the Invention

The invention disclosed broadly relates to communications systems, and more specifically relates to optimizing the allocation of bandwidth and communication links in a communication session, particularly when such optimization is based on a cost function.

2. Description of the Related Art

The information age is upon us, and information is transmitted by the ubiquitous communication link. Communication links abound in business and the marketplace, in our personal lives, in education, in entertainment, and in virtually every sector of society. Pagers, cellular phones, browsing the World-Wide Web, and E-mail are just some of the myriad applications that are requiring an ever increasing number of communication links. The two (or more) users on either end of a communication link may also be in a variety of relationships or hierarchies, such as peer-to-peer or client-server.

With the increasing amount of information flow and bandwidth requirements, there is a continuing need for management of the communication link. Many of the management systems simply look at the load on, or utilization of, the link. Such systems will redirect a communication session to another link or another route when a given link becomes overutilized.

Other management systems also employ a mechanism for addressing the costs involved. Bandwidth costs money, and without an infinite supply of free bandwidth there will always be tradeoffs. Larger bandwidth physical connections allow faster response times and faster transmit times, but they cost more money. This basic tradeoff applies to any communication link, regardless of protocol, standard, and technology. To be sure, there are continually more advances which provide more bandwidth for the dollar, but the basic tradeoff is still present. The logic behind these systems is that, because infinite bandwidth costs infinite dollars, one should only use the amount of bandwidth that one needs.

The most common approach is to utilize a timer. Many applications that run on desk-top computers have such timers built into them. After dialing-in to a service, the user knows, or will quickly find out, that a prolonged period of inactivity, one minute for example, will result in being disconnected. Some of these applications issue reminders before disconnecting the user. Some of them also allow the user to adjust the length of the time-out period.

The above situation was presented from the perspective of a user who either is connected or disconnected. That is, the user will either reserve all of the available bandwidth or none of it. It is also instructive to examine the situation from the perspective of a user with a more finely variable bandwidth requirement. Such a user will typically always need a physical connection, but the bandwidth required may vary considerably over time. Timers can also be used for these applications, and can be built into the communications protocol. ISDN, for example, has a timeout feature.

The performance of these approaches is not optimal, however. Accordingly, there is a need for a method for optimizing the allocation of bandwidth and communication links in a communication session which overcomes these problems, and for a system and a computer readable medium which implement the method.

BRIEF DESCRIPTION OF THE DRAWINGS

FIG. 3 contains a table showing sample values of the access frequency and the ring buffer storage for the case of consecutive time windows with a zero access density.

SUMMARY OF THE INVENTION

Figure 1:
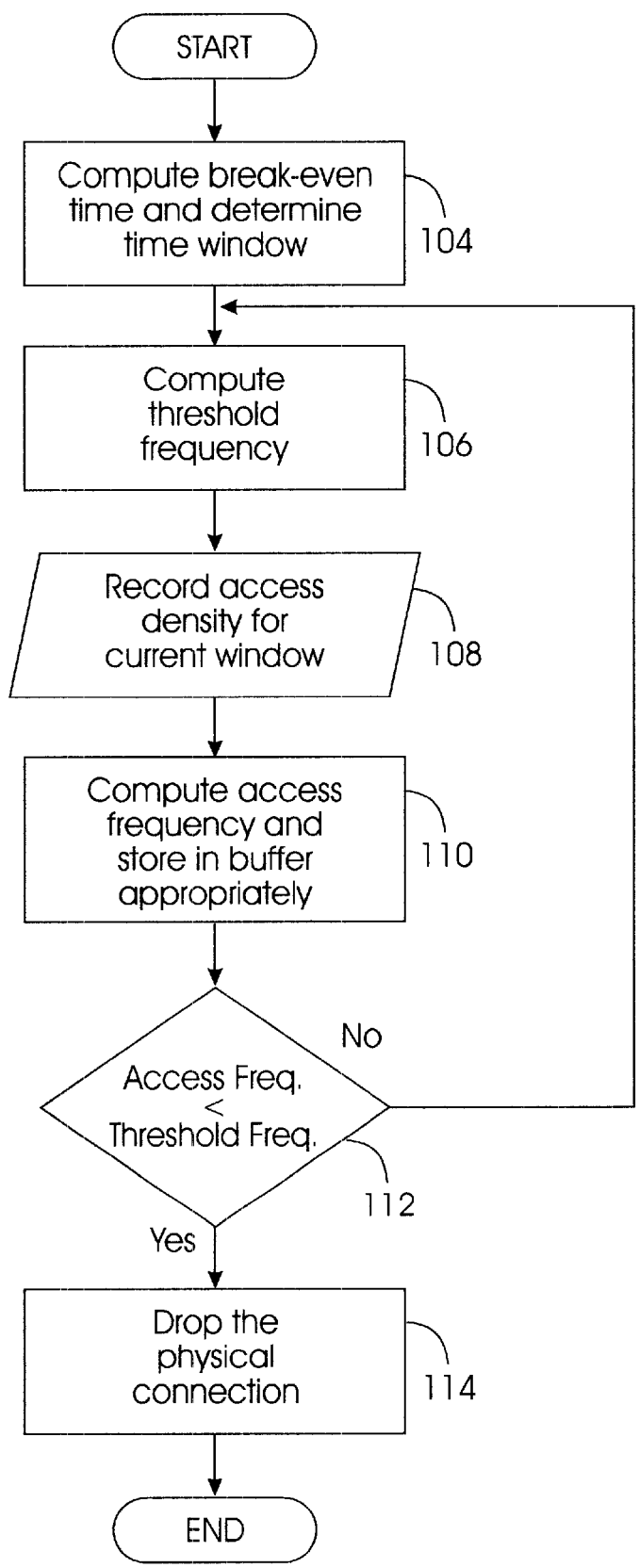
FIG. 1 shows a flowchart of the main algorithm of the preferred embodiment.

Briefly, in accordance with one aspect of the invention, a method for modifying the level of resources dedicated to a communications link comprises four steps. The first step is collecting access data from the communications link. The second step is computing an indicator of an access pattern, wherein the access pattern is formed from the collected access data from the communications link. The third step is determining whether or not the current access data is part of the current access pattern. The fourth step is adjusting, if necessary, the level of resources dedicated to the communications link. The step of adjusting is based on the determination of whether or not the current access data was part of the current access pattern.

Briefly, according to other aspects of the invention, there are disclosed an apparatus which implements the above described method, and a computer readable medium which contains instructions which implement the above described method.

DETAILED DESCRIPTION OF AN EMBODIMENT

The present application discloses a method for adjusting the bandwidth of a communication link (or, more generally, the level of resources dedicated to a communication link) that takes into account all of the relevant costs. A shortcoming of the prior art is that the methods available, such as a timer, had no mechanism for factoring in the actual costs. The present application also discloses a method for adjusting the bandwidth of a communications link that adapts to the actual usage pattern of the communications link. The present application further discloses a method for adjusting the bandwidth of a communications link that can evaluate the past performance of its "adjustments" and modify its decision making process appropriately. These evaluations can be made with reference to the costs involved, and the appropriate adjustments can be made to the level of resources dedicated to the communication link. A typical application of the preferred embodiment would be with a logical protocol such as Point-to-Point Protocol ("PPP"), which may in turn be used over a variety of physical protocols or connections such as Integrated Services Digital Network ("ISDN"), plain old telephone service ("POTS"), or switched services such as T1 and T3 lines. Alternate applications, including but not limited to the use of other logical and/or physical protocols are also clearly viable.

The present application introduces a cost-based function, or cost function. This cost function takes into account all of the fixed costs, which are typically easily measured in dollars. These fixed costs include the per minute charge for connection, for example. The cost function also takes into account the costs which are less easily quantifiable. From the perspective of the user of a service, these less quantifiable costs may include, but certainly are not limited to, the costs in lost opportunity while the user is waiting for a physical connection to be established (opportunity costs). From the perspective of the provider of a service, these less quantifiable costs may include the cost in lost customers or lost sales because the time required to make a connection or to increase the bandwidth is too long.

The cost function is used to give the user information on whether or not the level of resources dedicated to the physical connection should be modified, that is, on whether or not to decrease (or possibly increase, in anticipation of a periodic access, for example) the bandwidth. One possible way to do this is to calculate a cost parameter. One such parameter is the break-even time, which can be calculated if the cost function is quantifiable. The break-even time can be defined, for at least some applications, as the length of time that a deallocated (or dropped) resource would have to be idle in order for it to offset the costs of reallocating it. Whenever a physical connection is dropped, there will be cost savings. There will also typically be additional extra costs when, and if, the physical connection is reestablished. Therefore, if a physical connection is dropped because it is not presently needed, and if that physical connection needs to be reestablished again before the break-even time has passed, then it would have been less expensive to have never dropped it in the first place.

The cost parameter can be used in a variety of ways. The cost parameter can be used by applying it to the bandwidth requirements on the communication link. This can be done by using the break-even time to determine the length of the time window that will be used in collecting access data (also called utilization data. or link data) from the communication link. The break-even time, or any other cost parameter similarly used, will thus be used, albeit perhaps indirectly, in all subsequent stages in which the access data, or a parameter determined from the access data, is used. The preferred embodiment provides an illustration of this and will be further explained below.

The cost parameter may also be used solely in the decision making process. For example, if the communication link data, or utilization data, had a probability density function, or if one could be calculated, it may be feasible to calculate the probability that the link will not be needed until the break-even time has elapsed.

Additionally, if information is available on the access patterns, then this information could be used in determining how much bandwidth was required, or would be required. Using this information on "recurring" access patterns would not conflict with the goals of optimizing the cost function.

The access data that is collected holds the information that can be used to determine the access pattern. It will often be useful to develop an indicator of the access pattern, from the access data. For the last example, such an indicator could be the probability that the link will not be needed until the break-even time has elapsed. It may also be the particular length of time for which there is a 50% or greater probability that the link will not be needed until that particular amount of time has elapsed. In the preferred embodiment, there are several variables that can serve as an indicator of the access pattern. One is the observed number of link accesses that occur during the time window. A second is the access frequency, which is calculated from the number of link accesses (the access density). A third is the threshold frequency. All three will be described in more detail below. These various indicators are similar to the concept of a load, which in this case relates to the bandwidth required from the communications link.

As indicated above, the cost function can be very useful when combined with probabilistic information for the communication link. One approach is to ascertain or approximate the density function for accesses of the link or for inter-arrival times of the accesses. Another approach, described in the preferred embodiment, is to use the utilization data to determine when a particular access pattern has ended. This entails a temporal concern with past access data, and the indicators describing that pattern, and with current access data which will be compared to the past pattern.

The preferred embodiment is further explained below.

Overview and Definitions

Communications access patterns can be divided into two categories: uniform access patterns and sporadic access patterns. A uniform access pattern is defined as one for which the set of access frequencies is well defined statistically. The access frequencies can be considered well defined if the standard deviation is some small fraction of the mean. The mean is preferably greater than or equal to about 2–3 standard deviations, which will help to ensure that the tails of the distribution are defined. The probability that a new observation is part of the same distribution will be low (less than about 5%) if it is more than 3 standard deviations from the mean. Access frequencies are also considered well defined if, for example, they approximate a normal curve with a mean and a small standard deviation.

Otherwise, the access pattern is considered to have ended if the observed access frequency drops below the mean minus some multiple of the standard deviation. This is equivalent to choosing a probability that an observed access frequency no longer belongs in the observed access pattern. It is also possible to use a fraction of the minimum observed access frequency as an estimate of the end of the access pattern. The underlying principle is the use of the recent access frequencies to characterize the access pattern, and then determining from this a threshold frequency (which is chosen so that it indicates the end of the access pattern). It is then assumed to be highly probable that the access pattern has ceased when the access frequency crosses this threshold frequency.

Define $C_0$=incremental cost associated with the first minute of a call $C_1$=cost (per minute) for each minute of the call $C_2$=penalty or "cost" (per minute) associated with a delay in the response $T_0$=average time (in minutes) to establish a physical connection $T_1$=average time (in minutes) for a modem to complete negotiation once the physical connection has been established For the example, let $C_0$=$0.035

$C_1$=$0.01/min.

$C_2$=$0.00/min.

$T_0$=0.20 min. (12 sec.)

$T_1$=0.40 min. (24 sec.)

The following general steps, depicted in FIG. 1, are part of the preferred embodiment and will be discussed below.

1. Determine the cost break-even time and determine the time window 104.

2. Determine the threshold frequency to use 106. The threshold frequency computation is based, in part, on the break-even time and the time window, and may include adjustable gain factors. The threshold frequency also depends on the access frequencies.
3. During the operation of the model, record every access to the communications channel to determine the access density 108. Note that the access density changes as the pattern of communication accesses changes.
4. Convert the access density to an access frequency 110.
5. If the (dynamically changing) access frequency falls below the threshold frequency 112, then the communications channel is dropped 114 until the next communications access.
6. Repeat steps 2–5, such that the access density, the access frequencies, and the threshold frequency are recomputed, and the new access frequency is compared to the new threshold frequency each time.

Since some of the values are constants, the algorithm would appear as follows:

```
obtain constants for cost function;
determine break-even time and determine size of the time
    window;
determine initial thresholdFrequency (0.0);
loop (forever) do;
    determine accessDensity for one time window;
    save accessDensity and calculate accessFrequency;
    if (accessFrequency<thresholdFrequency)
        then break; // leave loop and drop communications
            connection
    determine new thresholdFrequency;
end-loop;
drop communications channel;
```

Step 1: Determine the Break-Even Time and the Time Window 104

The cost to establish a connection is $$\text{cost} = C_0 + C_1 * T_1 + C_2 * (T_0 + T_1)$$

This gives the break-even time ($T_{BE}$) as $$T_{BE} = (C_0 + C_1 * T_1 + C_2 * (T_0 + T_1))/C_1$$

or, for our example, $$T_{BE} = (0.035 + 0.01 * 0.2)/0.01 = 3.7 \text{ min.}$$

In general, the time window, $T_w$, is chosen to allow for good response to the range of access frequencies that the communications channel will encounter which have an impact on the decision to drop the communications channel. Frequencies of interest are those with periods close to the cost break-even time. Therefore, a time window that is close to a (small) integral fraction of the cost break-even time will be suitable. The time window may be further optimized by testing the behavior of the communications channel or through simulation. For the cost data assumed above, 2 minutes is a good choice for the time window, $T_w$.

Step 2: Determining the Access Density 108

Figure 2:
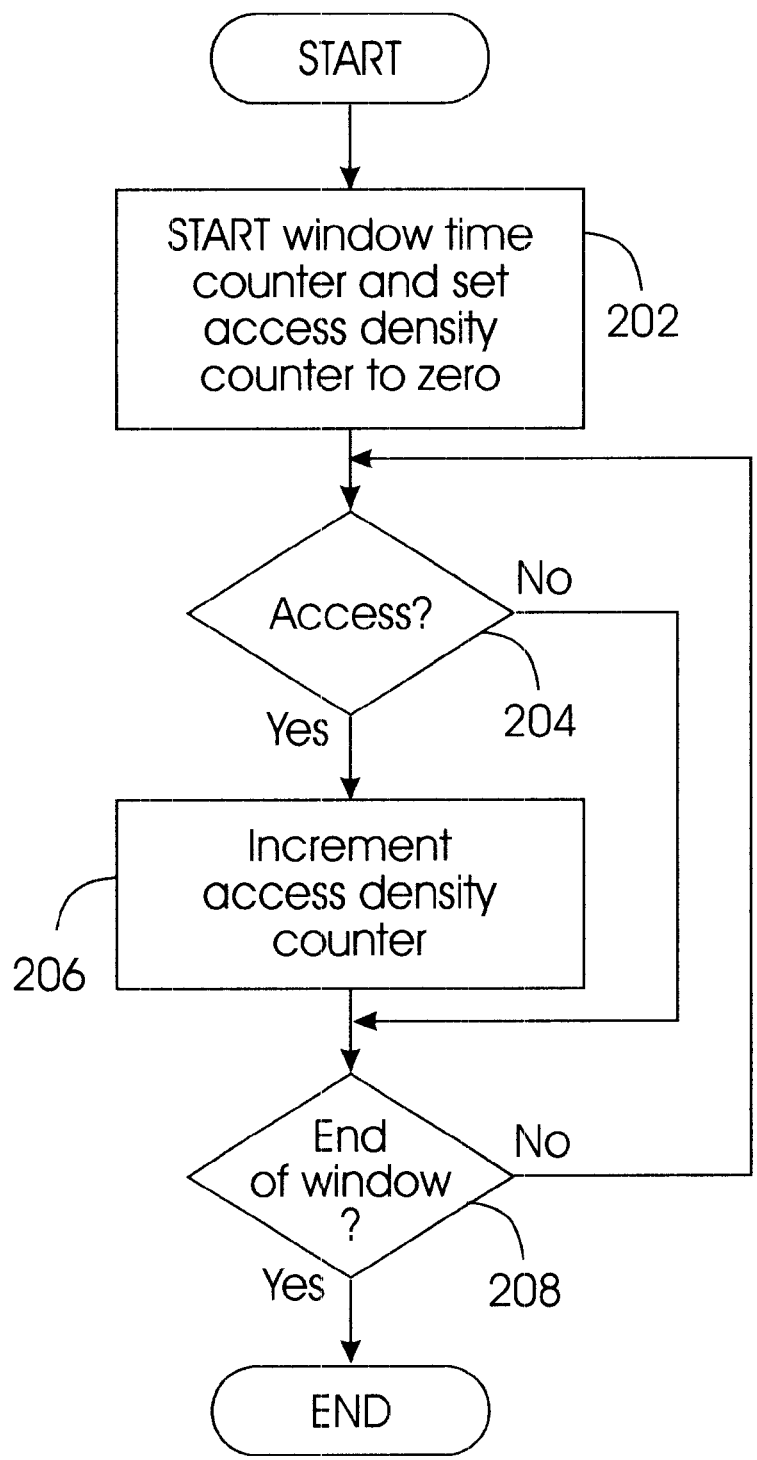
FIG. 2 shows a flowchart of the algorithm for gathering the access densities in each time window.

The access density is measured by counting the number of accesses that occur within the time window ($T_w$). The number of accesses that occur within a time window is called the access density. This process is shown in FIG. 2. Referring to FIG. 2, a time counter is started and the access density counter is initialized 202. Then a loop is entered which repeatedly checks for accesses 204 and increments the access density counter when an access occurs 206. This continues until the end of the window 208. The accesses can be polled for, or can be interrupt driven. The same is true for determining the end of the window. That is, the time counter can be repeatedly polled as shown in FIG. 2 208, or it can be interrupt driven. The preferred data structures for this part of the algorithm are:

a counter which can be read and written, and
a count-down timer, although it is clear that other structures, for example a count-up timer, could be used, and that these functions can be implemented in a variety of ways. The algorithm for determining the access densities is as follows:

```
loop (forever) do;
    counter=0;
    timer=T_w;
    loop (forever) do;
        if (communicationsAccess)
            then counter=counter +1;
        if (timer<=0)
            then break; //leave inner loop
    end-loop;
    save accessDensity (accessDensity=counter);
end-loop;
```

Note that depending on the implementation, there may be additional constraints. For example, if "communicationsAccess" is a flag that must be reset, then the outer loop must operate quickly enough to catch every communications access and, of course, the flag must be reset inside the loop.

Step 3: Convert the Access Density to an Access Frequency 110

The access density values obtained above are simply the number of communications accesses occurring during the time window, $T_w$. Therefore, the density values may be converted to frequency values by scaling or dividing these density values by the size of the time window. Any units can be used, as long as they are used consistently. The access frequency then gives the number of accesses per unit of time.

The dynamic range in frequency may be extended by realizing that a density of 0 during the time window is not equivalent to a frequency of 0. When the density is 0, the frequency is computed from the number of consecutive densities of 0. One such conversion equation is:

if (accessDensity>0) then accessFrequency accessDensity * scale;
else accessFrequency=scale/(number_of_zero_density+1

Number_of_zero_density is the number of consecutive time windows where the density is 0. This variable will be reset when communications are terminated by the access frequency being lower than the threshold frequency. Scale is a scaling factor for converting density to frequency. The equation provides a good approximation when the access frequency drops below 1 per $T_w$. If floating point arithmetic is used, then scale=$(1/T_w)$. If fixed point arithmetic is used, then the scale factor may be chosen for ease of computation; for example, to reduce the multiplication to a bit-shift operation.

Step 4: Determine the Threshold Frequency 106

As already indicated, the initial threshold frequency is set to zero. This is done so that any access will keep the connection open. The net result is that the connection will not be dropped until at least two time windows have passed. Even if the first time window had an access density of zero, the access density would be equal to (and not less than) the threshold frequency, thus avoiding dropping the connection.

The most recent access frequencies are stored in a ring buffer 110, which provides a sliding time window over the history of recent communication accesses. The ring buffer is a set of registers (or memory locations) into which each frequency measurement is loaded, replacing the oldest such frequency measurement. This set of frequency measurements is used to determine the threshold frequency. Note that in the preferred embodiment the threshold frequency is not updated with the current access frequency until after the two are compared. This causes a comparison between the current access frequency and the pattern established by previous accesses. Otherwise, the new access could contaminate the established access pattern. In alternate embodiments, however, this need not be the case.

```
initialize ring buffer elements to zero;
initialize minimum_number_of_elements, g1, g2,
    inactiveFrequency, activeFrequency;
number_of_elements=0;
frequencyCount=0;
lastFrequency=0.0;
loop (forever) do;
    obtain current accessFrequency;
    // Calculate the new threshold frequency
    if (number_of_elements>minimum_number
        of_elements)
        then do;
            minF=minimum frequency in ring buffer;
            maxF=maximum frequency in ring buffer;
            tF1=[(maxF+minF)/2]-g1(maxF-minF);
            tF2=minF/g2;
            thresholdFrequency=max(min(max(tF1,tF2),
                activeFrequency),inactiveFrequency);
        end-then;
    // Save the current accessFrequency as part of the
        access history
    if (accessFrequency>(1/T_w))
        then do;
            push accessFrequency into ring buffer;
            frequencyCount=1;
            lastFrequency=accessFrequency;
            increment number_of_elements;
        end-then;
        else do;
            // modify last frequency in ring buffer
            lowFrequency=
                [(frequencyCount*lastFrequency)+
                accessFrequency]/(frequencyCount+1);
            replace last accessFrequency in ring buffer with
                lowFrequency;
            frequencyCount=frequencyCount+1;
            lastFrequency=lowFrequency;
        end-else;
end-loop;
```

The size of the ring buffer is a trade-off between greater statistical accuracy and the combination of memory and computation. A value of $\max(16, 4*T_{BE}/T_w)$ for the size of the ring buffer is sufficient while not requiring either much computation or memory.

As the algorithm indicates, the ring buffer does not necessarily store all of the most recent access frequencies. If the access density is zero for two or more time windows in a row, then the current access frequency is used to modify the last stored value of the access frequency in the ring buffer. This is done to extend the useful content of the ring buffer without taking additional space. The information most useful is that relating to the higher frequencies, so this mechanism prevents the lower frequencies from crowding out the higher ones. As an example, this mechanism helps to preserve the maximum value in the buffer, which is used (along with the minimum value in the buffer) in calculating the threshold frequency. FIG. 3 contains a table 300 showing sample values that illustrate this process. In the preferred embodiment, the ring buffer and other frequency variables are implemented in floating point to accommodate the frequency values.

All entries are made as of the end of that time window and the calculations follow the algorithm given above. The access frequencies are calculated either by (i) dividing the access densities by 2 (the preferred embodiment has a time window of 2 minutes), or (ii) dividing ½ by one plus the number of successive time windows with a zero density. The frequency count variable is included merely for reference in following the algorithm. The last row shows the values that are stored in the ring buffer, assuming that at least 3 values can be stored and that they are all initialized to zero. The access frequency is pushed onto the ring buffer if the density was non-zero, otherwise the last value of the ring buffer is modified. The value is modified to reflect the average of the access frequencies for all of the consecutive zero-density windows and the last non-zero-density window. Thus, at the end of the fifth window, the access frequencies for the three zero-density windows are added to the frequency for the second window and the sum is divided by four.

The minimum_number_of_elements represents the minimum number of access frequencies that are needed to determine a threshold frequency, typically max(2,n) where n is the smallest integer such that $n*T_w > T_{BE}$. In the preferred embodiment, n takes the value of 2. Larger values ensure greater statistical accuracy, but require more computation. Additionally, a threshold frequency cannot be calculated immediately because the access frequency values must be collected in the ring buffer prior to computing a threshold frequency. This initial delay is exacerbated if any of the initial time windows have zero access densities.

The mean and standard deviation can be computed for the frequency values in the ring buffer; however, they may be approximated from the maximum and minimum frequencies in the ring buffer maxF and minF by the following expressions:

$$meanF=(maxF+minF)/2;$$

$$sdevF=(maxF-minF)/4;$$

These are reasonable estimates for a uniform access pattern since the distribution is assumed to be well characterized. For sporadic access patterns, some fraction of the minimum frequency is sufficient. Thus, the following calculations are used to calculate the threshold frequency.

$$tF1=[(maxF+minF)/2]-*g1*(maxF-minF)$$

$$tF2=minF/g2$$

$$thresholdFrequency=max(min(max(tF1,tF2),activeFrequency),inactiveFrequency):$$

For values of g1=0.5 and g2=4, tF1 represents the mean minus two times the standard deviation and is a useful formula for uniform access patterns, and tF2 represents one fourth of the minimum access frequency in the ring buffer and is a useful formula for sporadic access patterns. The preferred embodiment saves the calculations and memory which would be required to classify the type of access pattern. This approximation should be sufficient, and the max(tF1, tF2) provides a reasonable estimate as to which pattern is present. tF1 is larger for very regular or uniform patterns and tF2 is larger for sporadic patterns.

The activeFrequency represents sufficient accesses during a single time window such that communications are active enough not to consider dropping the communications channel. As a lower bound, $4/T_{BE}$ represents such a value; four communications accesses during the break-even time window is sufficient to ensure that it is cost effective to keep the communications channel active.

The inactiveFrequency represents sufficiently few accesses such that the communications channel should be dropped. A value of $1/(4*T_{BE})$ is suitable for our example; this represents less than one access during a span of time greater than four times the break-even time.

Both activeFrequency and inactiveFrequency are constants and are calculated as part of the initialization. They are then only used to calculate the threshold frequency. In the preferred embodiment, activeFrequency is set to 1.08 (4/3.7 minutes), and inactiveFrequency is set to 0.068 (1/4*3.7 minutes). The units used need only correspond to those used for the access frequency and threshold frequency. Note that the threshold frequency is dependent upon the break-even time in at least two ways. First, the threshold frequency depends on the inactive frequency and the active frequency, both of which are calculated using the break-even time. Second, the threshold frequency depends on the observation window length because all of the frequencies in the ring buffer are based on observations taken during one window length; the window length, being a fraction of the break-even time, is determined based on the break-even time.

There are two gain factors: g1 and g2, for uniform and sporadic access patterns, respectively. The gain factors may be different for each mode. For the preferred embodiment, g1=0.5 and g2=4 are suitable (as stated earlier). As can be observed, increasing the value of the gain factors has the effect of decreasing the threshold frequency, and decreasing the value of the gain factors has the effect of increasing the threshold frequency. Therefore, the behavior of the communications channel may be tuned through the choice and adjustment of these gain factors. The gain factors can be selected and adjusted by the user through suitable system or application software. These gain factors can be adaptively modified as well. For example, g1 and g2 can be changed in response to feedback information on the cost-effectiveness of the allocation decisions made by the system. The preferred method of adaptive modification is explained in detail in a later section.

Step 5: Dropping the Communications Channel 114

The communications channel is dropped if the access frequency drops below the threshold frequency. Both the access frequency and threshold frequency are dynamically varying with the access patterns of the communications. The algorithm is as follows:

```
thresholdFrequency=0.0;
loop (forever) do;
   obtain current accessFrequency;
   if (accessFrequency<thresholdFrequency)
      then break;
   determine new thresholdFrequency;
end-loop;
drop communications channel;
```

Putting It All Together

There are two independent threads or processes. The first collects the statistics on access density and passes the resulting value off the to second thread at the end of each time window, $T_w$. The second thread receives each accessDensity, calculates the accessFrequency, compares the accessFrequency against the thresholdFrequency to determine if the communications channel should be dropped, calculates a new thresholdFrequency based on the past history of the accessFrequency values (as stored in the ring buffer), and updates the ring buffer.

The code for the first thread is given under the Step 2: Determining the Access Density 108 section. The code for the second thread is gathered together from the remaining sections and given below.

```
initialize ring buffer elements to zero;
initialize minimum_number_of_elements, g1, g2, inactiveFrequency,
   activeFrequency;
number_of_elements = 0;   //number of elements in ring buffer
thresholdFrequency = 0.0; //if accessFrequency < thresholdFrequency,
                          //drop communications channel
frequencyCount = 0;       //number of accessFrequency values
                          //used to calculate lastFrequency
lastFrequency = 0.0;      //last calculated frequency
loop (forever) do;
   //Calculate access frequency
   obtain current accessDensity;
   if (accessDensity > 0)
      then accessFrequency = accessDensity/Tw;
      else accessFrequency = (I/Tw)*(1/(frequencyCount + 1));
   //Compare access frequency against threshold frequency
   if (accessFrequency < thresholdFrequency)
      then break;
   //Calculate the new threshold frequency
   if (number_of_elements > minimum_number of elements)
      then do;
         minF = minimum frequency in ring buffer;
         maxF = maximum frequency in ring buffer;
         tF1 = [(maxF + minF)/2]-g1*(maxF - minF)
         tF2 = minF/g2
         thresholdFrequency = max(min(max(tF1, tF2),
            activeFrequency), inactiveFrequency);
      end-then;
   //Save the current accessFrequency as part of the access history
   if (accessFrequency > (I/Tw))
      then do;
         push accessFrequency into ring buffer;
         frequencyCount = 1;
         last Frequency = accessFrequency;
         increment number_of_elements;
      end-then;
      else do;
         //modify last frequency in ring buffer//
         lowFrequency =
            [(frequencyCount*lastFrequency) + accessFrequency]
            /(frequencyCount + 1);
         replace last accessFrequency in ring buffer with lowFrequency;
         frequencyCount = frequencyCount + 1;
         lastFrequency = lowFrequency;
      end-else;
end-loop;
drop communications channel;
```

Adaptive Control Based on the Actual Performance

There are several parameters of the algorithms that have direct effects on the performance and cost of the total solution. The principle parameters are the gain factors, g1 and g2, and the length of the observation window. Satisfactory performance can be obtained using fixed values for these parameters; however, the suitability of these parameters may also depend upon the actual access pattern. New parameters may be selected if changes in the access pattern affect the connection behavior, or the parameters may be dynamically adjusted to follow changes in the access behavior. The dynamic changes to the parameters may be done using an adaptive system, which measures how the cost goal is being met, and dynamically adjusts the parameters accordingly.

Achieving dynamic adaptability requires the ability to measure the actual behavior, for comparison against the desired behavior using the cost function as the standard measure. The best performance will be obtained when both the magnitude and direction of the deviation from the cost target are measured. These measurements may be treated as penalties, which are then used to adjust the gain factors. It is convenient to define two classes of penalties; extra cost penalties (ecp) and missed opportunity penalties (mop). The former occur when bandwidth was released and then requested before the break-even time ($T_{BE}$) passed; this implies that the threshold frequency was set too high. The latter occur when bandwidth was not released when it would have been appropriate; this implies that the threshold frequency was set too low. Since the two types of penalties have opposite effects on the threshold frequency determination, they can be used to balance the behavior of the system. The units of measurement for ecp and mop are not important as long as they are compatible with each other.

The extra cost penalties (ecp) can be measured in the units of the cost function. This is measured as the excess cost incurred by releasing and then reacquiring the necessary bandwidth. Thus, if $T_0$ refers to the last timing window with an access density greater than zero, $T_1$ refers to the time at which the bandwidth is released, and $T_2$ refers to the time at which the bandwidth is again requested, then if $(T_2-T_1)<T_{BE}$ then $ecp$=excess cost $(T_2-T_1)$:

else $ecp$=0;

For many situations, a linear approximation of the excess cost function is sufficient. This is helpful in those cases where the cost function is a quadratic or other complicated function. A linear approximation for ecp is, for example, if $(T_2-T_1)<T_{BE}$ then $ecp=16-16*(T_2-T_1)/T_{BE}$;

else $ecp$=0;

This approximation is linear with a maximum of 16 and a minimum of 0 (e.g., $T_2-T_1=T_{BE}$).

The missed opportunity penalties (mop) can also be measured in the units of the cost function. A missed opportunity occurs either when bandwidth was not released but such would have resulted in a cost savings (type 1), or when the bandwidth could have been released much earlier for an additional cost savings (type 2). Both types of opportunities are considered only if it would have been possible to release the bandwidth for an additional cost savings. Like the extra cost penalty, the missed opportunity penalty may be computed in any convenient units, preferably in either frequency or time units.

Let the values $T_0$, $T_1$, and $T_2$ be defined as in the prior section. To elaborate, at $T_0$ the bandwidth could have been released, and at $T_2$ the bandwidth is again needed. For type 1 opportunities, the relevant times are $T_0$ and $T_2$ ($T_1$ being absent), and only the intervals larger than the break-even time are considered. The type 1 missed opportunity penalty equation is if $(T_2-T_0)>T_{BE}$ then $mop_1$=excess cost $(T_2-T_0)$;
else $mop_1$=0;

For many situations, a linear approximation of the excess cost function is sufficient. For example, if $(T_2-T_0)>T_{BE}$ then $mop_1=(T_2-T_0-T_{BE})$;

else $mop_1$=0;

The magnitude of the penalty is dependent on how much larger the opportunity is than the break-even time. Thus, larger penalties are incurred for larger opportunities, and smaller penalties for smaller opportunities.

For type 2 opportunities, the relevant times are $T_0$ and $T_1$. In these cases, the bandwidth was released at $T_1$, but could have been released earlier at $T_0$. The type 2 missed opportunity penalty equation is $mop_2$=excess cost $(T_1-T_0)$;

For many situations, a linear approximation of the excess cost function is sufficient. For example, $mop_2=(T_1-T_0)$;

Clearly, other penalty equations are possible. The above description assumes that missed opportunity penalties would not be taken if additional costs would be incurred.

The time histories of the penalties are preferably used to adjust the gain factors g1 and g2, but may also be used to adjust the length of the observation window and any other parameters that are being used. In the preferred embodiment, as individual penalties occur, they are added to a corresponding cumulative penalty value, cecp for cumulative extra cost penalties, and cmop for cumulative missed opportunity penalties. When one of these values crosses a predetermined trip level, then the selected parameters of the threshold frequency calculation are changed accordingly, and the cumulative value is reduced. When the bandwidth is reduced without incurring a penalty, then the corresponding cumulative penalty value is decreased by some amount. This has the effect of decaying the penalty over time, such that older penalties have less influence than newer penalties.

In the preferred embodiment, the penalties are tracked separately for uniform and sporadic accesses, and the appropriate gain factor, g1 or g2, is modified. The cumulative missed opportunity penalty is the sum of the type 1 and type 2 missed opportunity penalties. When a missed opportunity penalty occurs, the appropriate value (mop1 or mop2) is added to the cumulative penalty, cmop. In the preferred embodiment, the appropriate gain factor, g1 or g2, is decremented when the cumulative penalty exceeds a trip level mopt; A good value for mopt is 16. If there is no penalty, then cmop is decreased by a predetermined amount, cmod, to a lower limit of zero. A value of 2 is suitable for cmod. The units of cmop, mopt, and cmod should be the same as the units used for mop. The values used in the preferred embodiments are in units of minutes. Other units could be used, and would necessitate changing the values accordingly (e.g. 2 minutes could become 120 seconds).

The cumulative extra cost penalty, cecp, also needs to be tracked. When an extra cost penalty occurs, ecp is added to the cumulative penalty, cecp. In the preferred embodiment, the appropriate gain factor, g1 or g2, is incremented when the cumulative penalty exceeds a trip level ecpt. A good value for ecpt is 16. If there is no penalty, then cecp is decreased by the predetermined amount, cmod, to a lower limit of zero. Again, a value of 2 is suitable for cmod. Alternate embodiments may use separate variables for each class of penalty for the predetermined decrease amount. These separate variables could be called dmop and decp, and could be set separately. All of the variables, while set to constants in the preferred embodiment, could be adaptively modified in accordance with the performance of the particular system. Again, the units of cecp, ecpt, and cmod should be the same as the units used for ecp. The values used in the preferred embodiments are in units of minutes. Other units could be used, and would necessitate changing the values accordingly (e.g. 2 minutes could become 120 seconds).

In the preferred embodiment, g1 corresponds to a multiplier on an estimate of four times the standard deviation. This suggests some practical limits on g1: $0.25 < g1 < 1.25$. Statistically, the lower limit on g1 corresponds to about a 16% probability for normally distributed data that the threshold frequency is actually part of the distribution. Too small a lower limit will result in a high probability of releasing bandwidth inappropriately, and can actually substantially increase cost. The upper limit on g1 corresponds to about a $10^{-6}$ probability, which is likely to be more than sufficient. A reasonable starting value for g1 is 0.5 (as discussed in an earlier section of the application), which corresponds to about a 2.3% probability.

Similarly, since the inverse of g2 corresponds to a multiplier of the minimum frequency, minF, there are practical limits on it as well: $1 < g2 < 10$. The behavior of these limits is similar to those of g1, although they are not as well defined statistically. A reasonable starting value for g2 is 4 (as discussed in an earlier section of the application). To improve the selection of the limits, it may be desirable to consider empirical data and simulation.

Further, to implement the adaptive control, it is best to implement gain factors that span the allowable range in a uniform manner. Thus, we define two new gain factors, ng1 and ng2, which utilize two new variables ag1 and ag2, respectively. Ag1 and ag2 can be implemented as 8 bit integers. The equations for ng1 and ng2 are as follows.

$$ng1 = \min_{g1} + [(\max_{g1} - \min_{g1}) * ag1/255];$$

$$ng2 = (1/\max_{g2}) + [(1/\min_{g2} - 1/\max_{g2}) * ag2/255];$$

Note that ng1 replaces g1 and ng2 replaces 1/g2 in the preferred embodiment, and ag1 and ag2 are the gain factors modified by the adaptive control, with each in the range 0 to 255, inclusive. Then, the reasonable starting values of g1=0.5 and g2=4 correspond to starting values of ng1=0.5 and ng2=0.25. These in turn correspond to starting values of ag1=64 and ag2=43. For the preferred embodiment, the equations above reduce to:

$$ng1 = 0.25 + ag1/255;$$

$$ng2 = 0.10 + 0.9 * ag2/255;$$

and the equations for tF1 and tF2 become:

$$tF1 = [(\max F + \min F)/2] - ng1 * (\max F - \min F);$$

$$tF2 = \min F * ng2;$$

With the replacement of 1/g2 by ng2, an increment or decrement of ag2 has the opposite effect on ng2 than it would have for g2. Therefore, the basic algorithm becomes: (i) if mopt is triggered, then the threshold frequency was too low, so either decrease ag1 or increase ag2, and (ii) if ecpt is triggered, then the threshold frequency was too high, so either increase ag1 or decrease ag2. When ag1 and ag2 are modified, they can be incremented or decremented by any amount. Preferably this amount is set to a low value, such as 1. This will allow the system to gradually approach optimal performance. However, the size of the increment/decrement may be set to an alternate value or may take different values at different times. Alternate embodiments may prefer or need to reach optimization more quickly and may prefer larger "jumps" during startup. Other embodiments may also adjust the size of the "jump" depending on how, quickly or how often the system reaches one of the triggers. Note also that the speed of response is also affected by the value of the triggers themselves.

General Implementation

Figure 4:
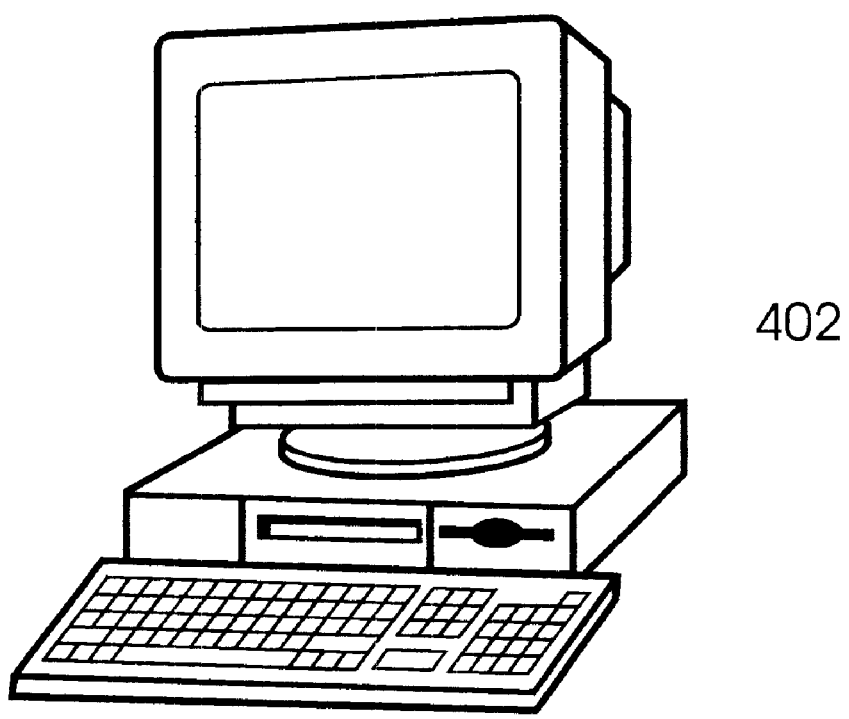
FIG. 4 shows an apparatus for implementing the method of the preferred embodiment.

Referring to FIG. 4, there is shown a system 402 for implementing the preferred embodiment described above. The system 402 is a personal computer which can perform the operations required in the disclosed embodiment. The present invention can be implemented by hardware, software, or a combination of both. The functions required can be performed by simple logic elements, advanced digital signal processing ("DSP") chips, microprocessors, EEPROMs containing appropriate instructions, dedicated logic, etc. Memory elements, where needed, can be registers on a chip with a processor, separate memory chips, latches, buffers, queues, etc. Certain functions may require tables or other organized memory structures to store information. For example, the allocation decisions can be kept in a table indicating when links are to be dropped or added. Allocations decisions may also be implemented (that is, adjustments to resources may be made) through switches or other circuit elements or devices, including electrical, mechanical, electromechanical devices. etc. Input devices, for example for cost parameters or information, may include switches, variable resistors or capacitors, and other circuit elements, as well as keyboards and screens and other higher level input devices.

Additionally, firmware routines or software routines, written in machine language, a high level language (for example, Fortran, Pascal, C), an object-oriented language like C++, or many others can implement the embodiments disclosed. Combinations of hardware and software could also be used to build a system that implements the preferred embodiment.

Moreover, at least some of this functionality may be embodied in computer readable media such as 3.5 inch diskettes to be used in programming an information-processing apparatus to perform in accordance with the invention. This functionality may also be embodied in computer readable media such as a transmitted waveform to be used in transmitting the information or functionality.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for modifying the level of resources dedicated to a communications link the method comprising the steps of:

collecting access data from the communications link;

computing an indicator of an access pattern, wherein the access pattern is formed from the collected access data from the communications link;

determining whether or not the current access data is part of the current access pattern; and adjusting, if necessary, the level of resources dedicated to the communications link, based on the determination of whether or not the current access data was part of the current access pattern.

2. The method of claim 1, wherein the step of collecting access data from the communications link utilizes a cost parameter.

3. The method of claim 2, further comprising the step of inputting the cost parameter from a cost-based function, wherein the cost-based function reflects the costs associated with using the communications link.

4. The method of claim 2, wherein:

the cost parameter comprises at least one break-even time, the at least one break-even time representing the amount of time that a particular resource needs to remain unused by the communications link, after the particular resource has been taken away from the communications link, in order to offset the costs of rededicating the particular resource to the communications link; and the step of collecting access data from the communications link comprises using a time window of a particular length for collecting the access data and utilizing the at least one break-even time in an indirect manner, wherein the indirect manner comprises determining the particular length of the time window based on the at least one break-even time.

5. The method of claim 1, wherein the step of computing an indicator of an access pattern utilizes a cost parameter.

6. The method of claim 5, wherein:

the cost parameter comprises at least one break-even time, the at least one break-even time representing the amount of time that a particular resource needs to remain unused by the communications link, after the particular resource has been taken away from the communications link, in order to offset the costs of rededicating the particular resource to the communications link; and the step of computing an indicator of an access pattern comprises calculating a threshold frequency and utilizing the at least one break-even time in an indirect manner, wherein the indirect manner comprises choosing values for a lower bound and for an upper bound for the threshold frequency based on the at least one break-even time.

7. The method of claim 1, wherein the indicator of an access pattern is an access density.

8. The method of claim 1, wherein the indicator of an access pattern is an access frequency.

9. The method of claim 1, wherein the indicator of an access pattern is a threshold frequency.

10. The method of claim 1, wherein:

the step of computing an indicator of an access pattern, wherein the access pattern is formed from the collected access data from the communications link, comprises computing an access frequency and a threshold frequency; and the step of determining whether or not particular access data is part of a particular access pattern comprises comparing the access frequency to the threshold frequency.

11. The method of claim 1, wherein the step of adjusting the level of resources dedicated to the communications link if it is determined that the current access data is not part of the current access pattern comprises lowering the level of resources.

12. The method of claim 1, further comprising the steps of:

computing an indicator of a recurring access pattern; and adjusting, if necessary, the level of resources dedicated to the communications link, in anticipation of the recurring access pattern.

13. The method of claim 12, wherein:

the cost-based function comprises the following parameters:

an incremental cost associated with the first unit of time of a call;

a use cost, per unit of time, for each unit of time of the call;

a penalty cost, per unit of time, associated with a delay in a response;

a connection time which represents the average time needed to establish a physical connection; and a negotiation time which represents the average time needed for a modem to complete negotiation once the physical connection has been established; and the cost parameter comprises a break-even time, wherein the break-even time is the amount of time that the physical connection must be unused, after it is no longer being used as an active physical connection, in order to offset the costs of reactivating the physical connection.

14. The method of claim 1, further comprising the steps of:

determining the costs associated with previous determinations of whether or not to adjust the level of resources dedicated to the communications link, wherein a cost parameter is utilized to determine the costs;

analyzing the costs associated with previous determinations of whether or not to adjust the level of resources dedicated to the communications link, in order to determine whether or not the previous determinations were cost effective; and adjusting the method, as necessary, if the previous determinations were not cost effective.

15. The method of claim 14, wherein:

the step of computing an indicator of an access pattern, wherein the access pattern is formed from the collected access data from the communications link, comprises computing a threshold frequency; and the step of adjusting the method, as necessary, if the previous determinations were not cost effective comprises modifying the function used to compute the threshold frequency.

16. The method of claim 1, wherein:

the step of collecting access data from the communications link comprises:

determining a time window for observation of the communications link and collection of data describing the usage of the link; and collecting the link data during the time window;

the step of computing an indicator of an access pattern, wherein the access pattern is formed from the collected access data from the communications link, comprises:

converting the link data which was collected during the time window into a current access frequency; and computing a threshold frequency based on past values of the link data;

the step of determining whether or not the current access data is part of the current access pattern comprises comparing the current access frequency with the threshold frequency; and the step of adjusting, if necessary, the level of resources dedicated to the communications link, based on the determination of whether or not the current access data was part of the current access pattern, comprises dropping the physical connection if the current access frequency is lower than the threshold frequency.

17. An apparatus for modifying the level of resources dedicated to a communications link, the apparatus comprising:

means for collecting access data from the communications link;

means for computing an indicator of an access pattern, wherein the access pattern is formed from the collected access data from the communications link;

means for determining whether or not the current access data is part of the current access pattern; and means for adjusting, if necessary, the level of resources dedicated to the communications link, based on the determination of whether or not the current access data was part of the current access pattern.

18. The apparatus of claim 17, further comprising means for computing a cost parameter from a cost-based function, wherein the cost-based function reflects the costs associated with using the communications link, and wherein the cost parameter is used in collecting the access data from the communications link.

19. The apparatus of claim 17, further comprising means for inputting information related to the costs which are associated with using the communications link, wherein the information is used in determining whether or not the current access data is part of the current access pattern.

20. The apparatus of claim 19, wherein:

the information related to the costs comprises a break-even time, the break-even time representing the amount of time that a particular resource needs to remain unused by the communications link, after the particular resource has been taken away from the communications link, in order to offset the costs of rededicating the particular resource to the communications link; and the means for inputting the break-even time comprises a variable resistor and a register, wherein the variable resistor is electrically coupled to the register.

21. The apparatus of claim 19, wherein:

the information related to the costs comprises a break-even time, the break-even time representing the amount of time that a particular resource needs to remain unused by the communications link, after the particular resource has been taken away from the communications link, in order to offset the costs of rededicating the particular resource to the communications link; and the means for inputting the break-even time comprises a keyboard and a computer screen, wherein the keyboard is electrically coupled to the computer screen.

22. The apparatus of claim 17, further comprising:

means for determining the costs associated with previous determinations of whether or not to adjust the level of resources dedicated to the communications link;

means for analyzing the costs associated with previous determinations of whether or not to adjust the level of resources dedicated to the communications link, in order to determine whether or not the previous determinations were cost effective; and means for adjusting the method, as necessary, if the previous determinations were not cost effective.

23. The apparatus of claim 17, wherein:

the means for collecting access data from the communications link comprises a memory device;

the means for computing an indicator of an access pattern, wherein the access pattern is formed from the collected access data from the communications link, comprises a processor and the memory device, wherein the processor is coupled to the memory device;

the means for determining whether or not the current access data is part of the current access pattern comprises the processor and the memory device; and the means for adjusting, if necessary, the level of resources dedicated to the communications link, based on the determination of whether or not the current access data was part of the current access pattern, comprises the processor and the memory device, wherein the means for adjusting changes the entries in a table in the memory device which indicates which resources are to be dedicated to the communications link.

24. The apparatus of claim 17, wherein the means for computing an indicator of an access pattern, wherein the access pattern is formed from the collected access data from the communications link, comprises a processor and a series of registers, wherein the processor and the series of registers are on the same chip.

25. The apparatus of claim 17, wherein the means for computing an indicator of an access pattern, wherein the access pattern is formed from the collected access data from the communications link, comprises dedicated logic.

26. A computer readable medium comprising program instructions for modifying the level of resources dedicated to a communications link, the program instructions comprising instructions for:

collecting access data from the communications link;

computing an indicator of an access pattern, wherein the access pattern is formed from the collected access data from the communications link;

determining whether or not the current access data is part of the current access pattern; and adjusting, if necessary, the level of resources dedicated to the communications link, based on the determination of whether or not the current access data was part of the current access pattern.

27. The medium of claim 26, further comprising instructions for computing a cost parameter from a cost-based function, wherein the cost-based function reflects the costs associated with using the communications link, and wherein the cost parameter is used in collecting access data from the communications link.

28. The medium of claim 26, further comprising instructions for:

determining the costs associated with previous determinations of whether or not to adjust the level of resources dedicated to the communications link;

analyzing the costs associated with previous determinations of whether or not to adjust the level of resources dedicated to the communications link, in order to determine whether or not the previous determinations were cost effective; and adjusting the method, as necessary, if the previous determinations were not cost effective.

29. The medium of claim 26, wherein:

the instructions for collecting access data from the communications link comprise instructions for:
  determining a time window for observation of the communications link and collection of data describing the usage of the link; and
  collecting the link data during the time window;

the instructions for computing an indicator of an access pattern, wherein the access pattern is formed from the collected access data from the communications link, comprise instructions for:
  converting the link data which was collected during the time window into a current access frequency; and
  computing a threshold frequency based on past values of the link data;

the instructions for determining whether or not the current access data is part of the current access pattern comprise instructions for comparing the current access frequency with the threshold frequency; and the instructions for adjusting, if necessary, the level of resources dedicated to the communications link, based on the determination of whether or not the current access data was part of the current access pattern, comprise instructions for dropping the physical connection if the current access frequency is lower than the threshold frequency.

* * * * *